United States Patent Office 2,987,309
Patented June 6, 1961

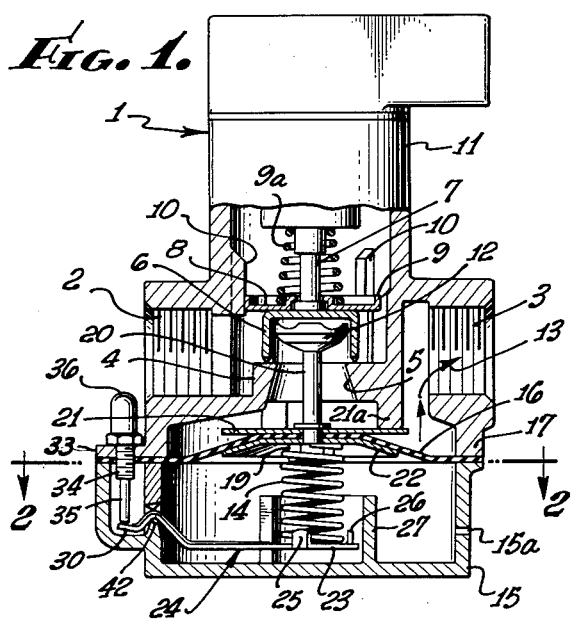

2,987,309
ADJUSTMENT MECHANISM FOR VALVES
Laurence C. Biggle, Altadena, Calif., assignor to General Controls Co., Glendale, Calif., a corporation of California
Filed July 17, 1959, Ser. No. 827,885
3 Claims. (Cl. 267—1)

This invention relates to valves, and particularly to valves having resiliently biased parts. For example, it is common in pressure regulator valves to provide a compression spring that urges the closure toward open position; and the force of the spring is opposed by the force due to the pressure of the fluid acting on the closure. One such structure is shown in application Serial No. 815,471, filed in the name of Laurence C. Biggle on May 25, 1959, and entitled "Valve Construction Involving Removable Cage Structures." Of course, other forms of valves may utilize such a spring.

It is important to be able to adjust the pressure of the spring, as for example, to cause the output pressure of the regulator valve to be kept at or near a desired value.

It has been common in the past to provide such adjustment by the aid of a screw or the like placed in proximity to the spring. Often a long screw is needed to provide the desired range of adjustment. Furthermore, usually the screw is placed on the bottom of the valve and therefore relatively difficult to reach.

It is an object of this invention to provide an adjustment mechanism that cures these difficulties.

More particularly, this object is effected by the use of a supporting lever for the spring, and adjusted from the top side of the valve. By appropriate proportioning of the lever, a wide range of adjustment is possible.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a view, mainly in vertical section, of a valve structure incorporating the invention, the adjustment mechanism for the valve being shown in section along a plane corresponding to line 3—3 of FIG. 2;

FIG. 2 is an enlarged fragmentary view, taken from a plane corresponding to line 2—2 of FIG. 1;

FIG. 3 is an enlarged fragmentary sectional view, taken along a plane corresponding to line 3—3 of FIG. 2; and FIG. 4 is a perspective view of a part of the apparatus incorporating the invention.

In the present instance, the invention is incorporated in a valve structure having a valve body 1. The valve body 1 is provided with an inlet opening 2 and an outlet opening 3.

Interposed between the inlet and the outlet is a wall 4 formed transversely in the valve body 1, and having a through port 5. In the present instance, the port 5 is controlled by an inverted cup-shaped closure member 6. This closure member is appropriately supported on a stem 7 extending upwardly from the cup 6. A plate 8, having an upturned flange 9, is disposed above the closure member 6 and is urged downwardly against the closure member 6 by the aid of a compression spring 9a. In this way the closure member 6 is urged toward the closing position. By appropriate electromagnetic means, the stem 7 may be moved upwardly to open the valve.

In order to guide the movement of the stem 7 so as to position the lower edge of the closure member 6 properly upon the upper surface of the wall 4, the flange 9 is guided by a plurality of inwardly directed ribs 10 shown as formed integrally with the wall 11 of the body 1.

The valve as thus far described may be any of well-known types. In the present instance, the cup-shaped member 6 permits the accommodation of another closure member 12 disposed above the port 5. The closure member 12 has a lower conical shaped surface adapted to define an annular opening through which gas may pass downwardly through the port 5 and thence upwardly, as indicated by the arrow 13, to the outlet 3.

Regulation of the position of the closure member 12 with respect to the port 5 serves to determine the pressure that exists at the outlet port 3. Thus, the closure member 12 may operate as a pressure regulator.

The pressure of the gas entering the body 1 through the inlet 2 when the closure member 6 is elevated urges the closure 12 toward the port 5. This force, due to the pressure of the incoming gas, is opposed by the pressure of a compression spring 14 located in a casing 15. This casing 15 is hollow. A flexible diaphragm 16, disposed between the flange 17 of body 1, and the casing 15, serves as a cover for the lower portion of the body 1. Appropriate screws or bolts 18 (FIG. 2) are provided for maintaining the body 1 fluid-tight. The casing 15 has a vent hole 15a.

A nut 19 serves to attach the diaphragm 16 to a stem 20 upon which the closure member 12 is mounted. Preferably a metal plate or washer 21 is disposed above the diaphragm, and a dished metal plate 22 is disposed below the diaphragm. Plate or washer 21 serves to limit upward movement of closure member 12 by contacting the downwardly facing flange 21a.

The lower end of the compression spring 14 is supported on the end 23 of a lever 24. Accordingly, the position of the lever 24 about its fulcrum determines the degree of compression of the spring 14. The end 23 has a plurality of projections 25, some of which have upturned edges for confining the spring 14 against lateral motion. The lever 24 extends through a slot 26 in an annular wall 27 integral with the bottom wall of the casing 15.

As shown most clearly in FIG. 3, the lever 24 is provided with a saddle 28 that passes through a narrow slot 29a (FIG. 4) in the wall of the casing 15. To reinforce the lever 24, an integral rib 29 is formed therewith. The lower side of the saddle engages a fulcrum 42 formed at the bottom of slot 29a.

The lever 24 has a short arm 30 projecting into a supplemental chamber 31 formed by the integral wall 32 extending from a wall of the casing 15. The valve body 1 has an extension 33 disposed over chamber 31 and covering it. Into the space extends an adjusting screw 34 by being threaded through the extension 33 and passing through the edge of the diaphragm 16. The lower end of this adjusting screw has a reduced cylindrical portion 35, and engages the short arm 30 of the lever 24.

If desired, a protecting screw cap 36 may be provided to keep the screw 34 protected against accidental operation.

In order to restrain the lever 24 against upward movement in the slot 29a, use is made of a key 37 (FIG. 4). This key has an enlarged head portion 38 extending into the wide slot 39 adjacent the upper edge of the wall of casing 15, and communicating with a somewhat narrower slot 39a.

The lower edge of the head portion 38 is tapered in order to fit the tapered sockets or recesses 40 in the wall of casing 15.

The lowermost edge of the key 37 is similarly tapered to fit the seats 41 disposed adjacent the slot 29a. There is a central, flat portion 43 of the key that overlies the saddle 28, and the key 37, as shown most clearly in FIG. 3, confines the saddle against unwanted vertical movement away from the fulcrum or knife-edge 42.

By the aid of this arrangement, the compression spring 14 can be caused to exert a greater or less force that urges the pressure regulator closure 12 away from the upper edge of the port 5. The adjustment means is conveniently available from the upper side of the casing 15, and a substantially extended range of adjustment is provided due to the mechanical advantage of the lever 24.

The inventor claims:

1. In a spring adjustment structure for a fluid pressure regulator: a helical spring; a support for one end of the spring, the other end serving to exert a resilient regulating force; a lever upon which the support is mounted; a casing enclosing the spring and lever; said casing having a slotted wall, the bottom of the slot defining a fulcrum for the lever; a key entering the slot in the wall for confining the lever against the fulcrum; said lever having a portion extending outwardly of the casing; and adjusting means operating upon said portion.

2. The combination as set forth in claim 1, in which the adjusting means is a screw, the spring and the screw being located on the same side of the lever, but at separated points.

3. In a spring adjustment structure for a fluid pressure regulator: a helical spring; a support for one end of the spring, the other end serving to exert a resilient regulating force; a lever upon which the support is mounted; a casing enclosing the spring and lever; said casing having a slotted wall, the bottom of the slot forming a knife-edge fulcrum for the lever, said lever having a saddle resting on the knife-edge and having an end extending out of the casing; a key entering the slot in the wall for confining the lever against the fulcrum; and adjusting means operating upon said lever end.

References Cited in the file of this patent

UNITED STATES PATENTS

| 2,306,060 | Jacobsson | Dec. 22, 1942 |
| 2,715,416 | McKinley | Aug. 16, 1955 |
| 2,735,669 | Seiler | Feb. 21, 1956 |

FOREIGN PATENTS

| 38,310 | Netherlands | June 15, 1936 |